United States Patent
Kawakita et al.

(10) Patent No.: US 7,942,042 B2
(45) Date of Patent: May 17, 2011

(54) APPARATUS CONFIGURED TO ESTIMATE QUANTITY OF FUEL STORED IN VEHICLE

(75) Inventors: Koji Kawakita, Ohbu (JP); Katsunori Ueda, Okazaki (JP); Toshiyuki Miyata, Okazaki (JP); Hiroki Yamamoto, Nagoya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 164 days.

(21) Appl. No.: 12/362,010

(22) Filed: Jan. 29, 2009

(65) Prior Publication Data

US 2009/0211349 A1  Aug. 27, 2009

(30) Foreign Application Priority Data

Feb. 27, 2008 (JP) .................. P2008-045753

(51) Int. Cl.
*G01M 17/00* (2006.01)

(52) U.S. Cl. ...................................... 73/114.54; 73/291

(58) Field of Classification Search ............... 73/114.38, 73/114.52, 114.53, 114.54, 290 R, 291
See application file for complete search history.

(56) References Cited

U.S. PATENT DOCUMENTS

2006/0027017 A1  2/2006  Kamatsuke

FOREIGN PATENT DOCUMENTS

JP  2006-47100 A  2/2006

*Primary Examiner* — Eric S McCall
(74) *Attorney, Agent, or Firm* — Birch, Stewart, Kolasch & Birch, LLP

(57) ABSTRACT

An apparatus, configured to estimate quantity of fuel stored in a vehicle, includes: a fuel tank; a fuel quantity measure; a filtering processor; a filter gain setter, configured to set a filter gain; and a vehicle status detector, configured to detect which one of a starting state, a halted state, a state achieved immediately after stoppage of the vehicle, and a traveling state, wherein the filter gain setter sets: a first gain as the filter gain when the vehicle is the starting state; a second gain as the filter gain, which is larger than the first gain, when the vehicle is in the traveling state or the state achieved immediately after stoppage of the vehicle; and a third gain as a filter gain, which is larger than the first gain and smaller than the second gain, when the vehicle is in the halted state.

5 Claims, 4 Drawing Sheets

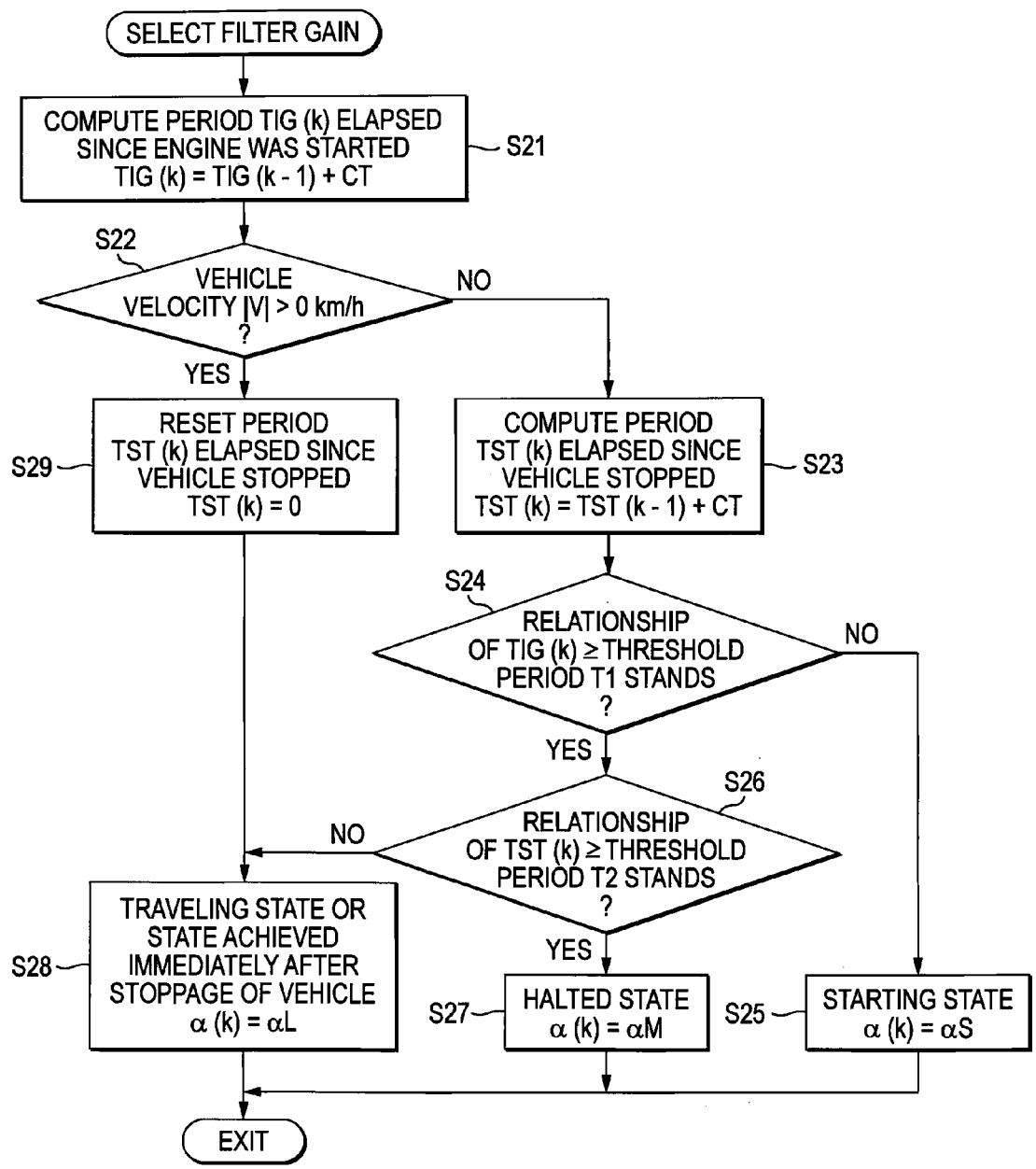

APPARATUS CONFIGURED TO ESTIMATE QUANTITY OF FUEL STORED IN VEHICLE

BACKGROUND

1. Field of the Invention

The present invention relates to a fuel quantity estimation apparatus for estimating the quantity of fuel in a fuel tank mounted in a vehicle in accordance with a traveling state of a vehicle.

2. Description of the Related Art

A technique for estimating the quantity of fuel in a fuel tank mounted in a vehicle has hitherto been known.

JP-A-2006-47100 is mentioned as a literature showing an example of such a technique.

As shown in FIG. 3, JP-A-2006-47100 discloses that a fuel level correction section (66A) of control means (66) makes a correction to a power value output from a fuel level gauge (50) through filtering (see descriptions provided in paragraphs [0025] to [0027] in JP-A-2006-47100).

JP-A-2006-47100 also discloses that a primary filter exhibiting high response performs filtering correction after a first set time has elapsed since an ignition switch (96) was turned on and that a secondary filter exhibiting low response performs filtering correction after elapse of a second set time (see descriptions provided in paragraphs [0027] to [0032] in JP-A-2006-47100).

However, the degree of undulation of fuel in a fuel tank changes from time to time due to vibrations experienced by a vehicle, and under the technique of JP-A-2006-47100 difficulty is encountered in appropriately estimating the quantity of the fuel stored in the fuel tank.

As shown in FIG. 1, according to the technique of JP-A-2006-47100, the secondary filter is used for any one of cases where the engine of a vehicle is started, where a vehicle is running, and where the engine of the vehicle is stopped. Therefore, there is a potential of occurrence of a situation in which a difference between the quantity of fuel actually stored in a fuel tank and an estimated value acquired by means of filtering correction cannot be disregarded.

SUMMARY

It is therefore one advantageous aspect of the invention to provide an apparatus for estimating fuel stored in a vehicle that enables high-precision estimation of the quantity of fuel stored in a fuel tank mounted in a vehicle in accordance with a traveling state of a vehicle.

According to an aspect of the invention, there is provided An apparatus, configured to estimate quantity of fuel stored in a vehicle, including: a fuel tank, configured to store fuel used for an engine mounted in the vehicle; a fuel quantity measure, configured to measure quantity of fuel stored in the fuel tank; a filtering processor, configured to subject the quantity of fuel to filter processing by a filter gain to detect an estimated quantity of fuel stored in the fuel tank; a filter gain setter, configured to set the filter gain; and a vehicle status detector, configured to detect which one of a starting state, a halted state, a state achieved immediately after stoppage of the vehicle, and a traveling state corresponds to a state of the vehicle, wherein the filter gain setter sets a first gain as the filter gain when the vehicle status detector detects that the vehicle is the starting state; sets a second gain as the filter gain, which is larger than the first gain, when the vehicle status determination means determines that the vehicle is in the traveling state or the state achieved immediately after stoppage of the vehicle; and sets a third gain as a filter gain, which is larger than the first gain and smaller than the second gain, when the vehicle status determination means determines that the vehicle is in the halted state.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 3 is a schematic flowchart showing operation of the apparatus for estimating the quantity of fuel stored in a vehicle of the embodiment of the present invention; i.e., a subroutine.

DETAILED DESCRIPTION OF THE INVENTION

Figure 1:
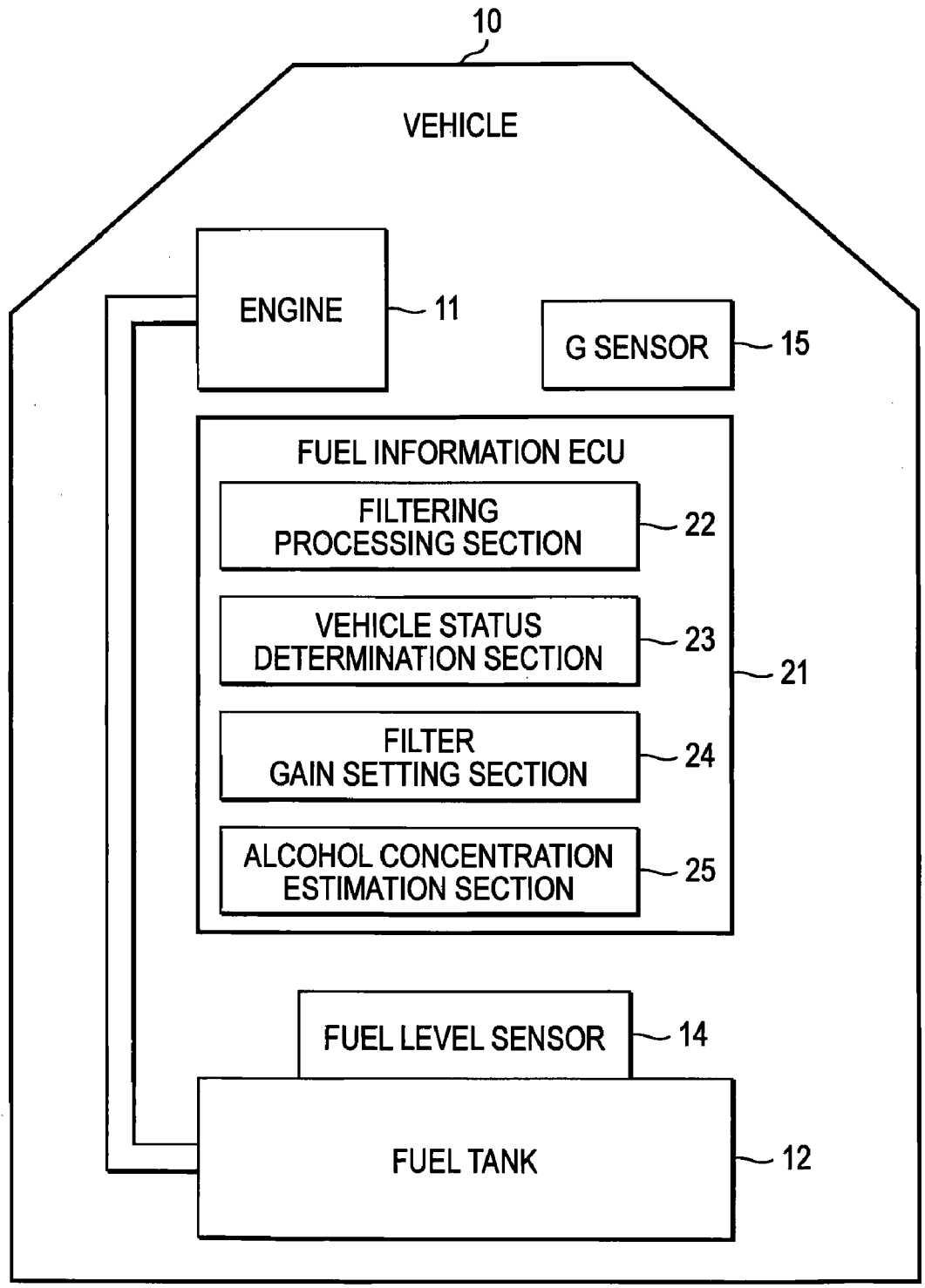
FIG. 1 is a schematic block diagram showing the overall configuration of an apparatus for estimating the quantity of fuel stored in a vehicle of an embodiment of the present invention.
Figure 2:
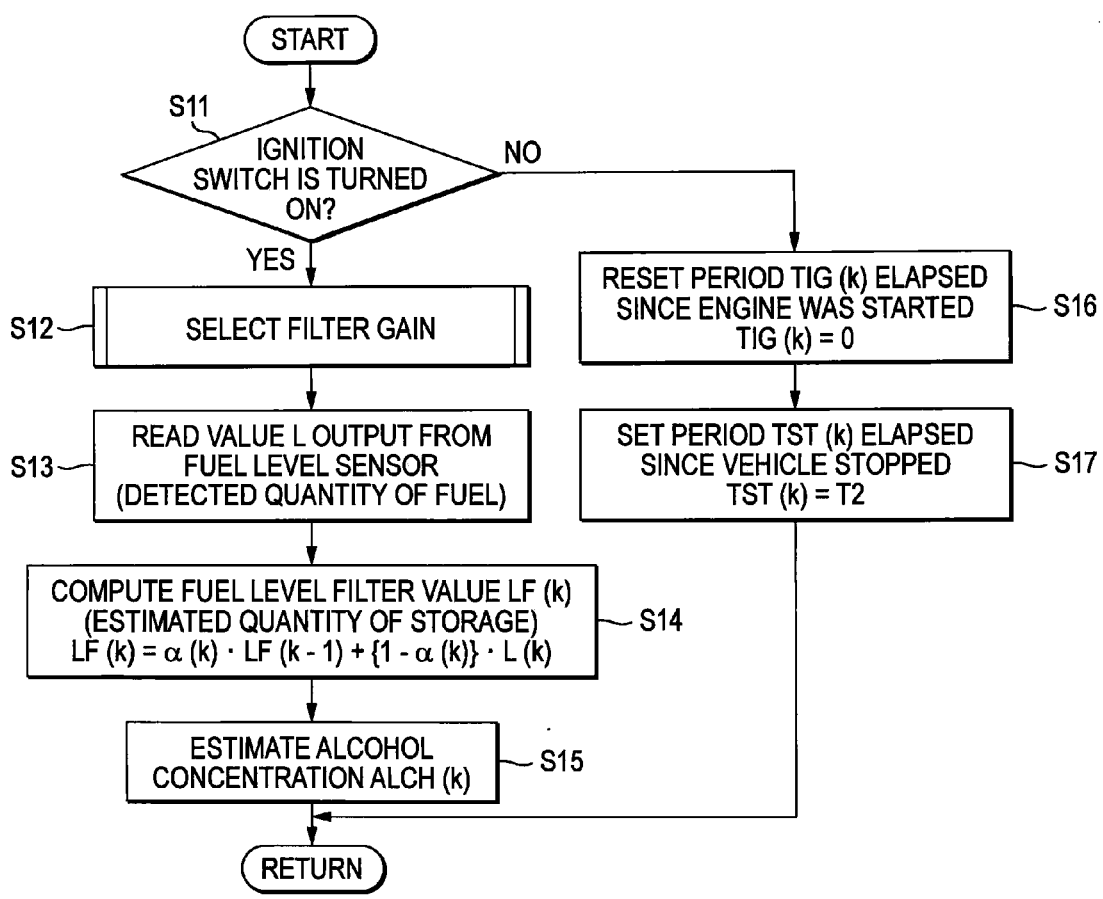
FIG. 2 is a schematic flowchart showing operation of the apparatus for estimating the quantity of fuel stored in a vehicle of the embodiment of the present invention.
Figures 4A, 4B:
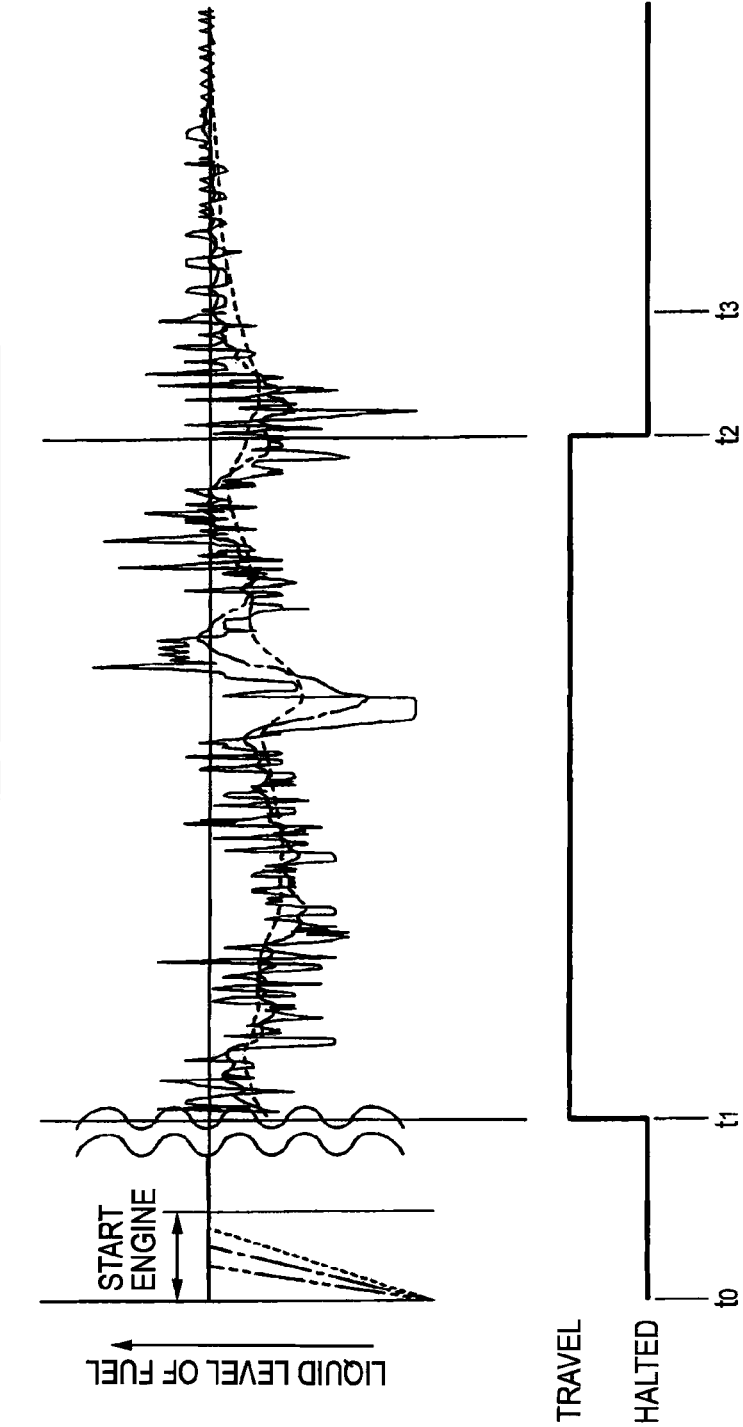
FIGS. 4A and 4B are schematic timing charts showing operation of the apparatus for estimating the quantity of fuel stored in a vehicle of the embodiment of the present invention.

An apparatus for estimating the quantity of fuel stored in a vehicle according to an embodiment of the present invention will be described hereunder by reference to the drawings. FIG. 1 is a schematic block diagram showing the overall configuration of the apparatus; FIG. 2 is a schematic flowchart showing operation of the apparatus; FIG. 3 is a schematic flowchart showing a subroutine pertaining to setting of a filter gain; and FIGS. 4A and 4B are schematic timing charts showing operation of the subroutine.

As shown in FIG. 1, a vehicle 10 is equipped with an engine 11 and a fuel tank 12 storing a composite fuel to be supplied to the engine 11. The engine 11 and the fuel tank 12 are connected together by means of a fuel pipe 13.

The composite fuel to be stored in the fuel tank 12 is primarily made of gasoline and alcohol. Specifically, the engine 11 generates driving force by combustion of the composite fuel. Further, the property of the composite fuel used for the engine 11 exhibits a high degree of freedom (e.g., the concentration of alcohol in a fuel, the type of alcohol, and the like). Hence, an unillustrated engine controller adjusts the amount of fuel ejected into the engine 11 and ignition timing, as appropriate, in accordance with the property of the composite fuel. The vehicle that runs by acquiring driving force from such an engine 11 is called a flexible fuel vehicle (FFV) and recently gains attention from the viewpoint of protection of a global environment. The vehicle 10 of the present embodiment is an FFV.

The vehicle 10 is equipped with a fuel level sensor (fuel quantity measurement means) 14 for measuring the quantity of stored fuel by measuring the height of a liquid level of fuel (stored fuel) stored in the fuel tank 12. The quantity of stored fuel measured by the fuel level sensor 14 is called a measured fuel quantity L.

Moreover, the vehicle 10 is provided with a G sensor (an acceleration sensor) 15 for detecting acceleration.

Both the fuel level sensor 14 and the acceleration sensor 15 are connected to a fuel information ECU 21 in a communicable manner.

The fuel information ECU 21 is an electronic control unit having a CPU and memory, both of which are not illustrated, and processes information about the fuel stored in the fuel tank 12.

The fuel information ECU 21 is provided with a filtering processing section (filtering processing means) 22, a vehicle status determination section (vehicle status determination means) 23, a filter gain setting section (filter gain setting means) 24, and an alcohol concentration estimation section (alcohol content estimation means) 25, all of which are embodied in the form of software.

Of these sections, the filtering processing section 22 multiplies the quantity of fuel L measured by the fuel level sensor 14 by a predetermined filter gain α, thereby performing filtering processing for computing an estimated quantity of storage LF.

The estimated quantity of storage LF is widely used as an index that shows the quantity of fuel stored in the fuel tank 12 in the vehicle 10.

The reason why the estimated quantity of storage LF is used as an index showing the quantity of fuel stored in the fuel tank 12 rather than the measured quantity of fuel L is that the liquid level of the fuel in the fuel tank 12 unstably undulates. In short, the quantity of fuel L measured by the fuel level sensor 14 faithfully reflects fluctuations of the height of the liquid level of the fuel in the fuel tank 12 and hence is very unstable. Use of such an unstable index for various control operations is not preferable.

Equation (1) provided below is used for computing the estimated quantity of storage LF performed by the filtering processing section 22.

$$LF(k)=\alpha(k)\cdot LF(k-1)+\{1-\alpha(k)\}\cdot L(k) \qquad (1)$$

In Equation (1), Equations (2) and (3) to be described later, and FIGS. 2 and 3 to be described later, reference symbol (k) designates a $k^{th}$ control period.

The vehicle status determination section 23 determines which one of a starting state, a halted state, a state achieved immediately after stoppage, and a traveling state corresponds to the status of the vehicle 10.

More specifically, the vehicle status determination section 23 is arranged so as to estimate the status of the vehicle 10 as a "starting state" when the vehicle velocity V of the vehicle 10 is zero and when a period TIG achieved after activation of an ignition switch (omitted from the drawing) (a period elapsed since the engine 11 was started) does not reach a first threshold period T1.

When the vehicle velocity V is zero, when the period TIG elapsed since the vehicle was started reaches the first threshold period T1, and when a period TST (time elapsed since the vehicle stopped) achieved after the vehicle velocity V has come to zero does not reach a second threshold period T2, the vehicle status determination section 23 is arranged so as to estimate that the vehicle 10 is in a "state achieved immediately after stoppage."

When the vehicle velocity V is zero, when the period TIG elapsed since the vehicle was started reaches the first threshold period T1, and when the period TST elapsed since the vehicle stopped reaches the second threshold period T2, the vehicle status determination section 23 is arranged so as to estimate that the vehicle 10 is in a "stopped state."

Moreover, when the absolute value of the vehicle velocity V is greater than zero, the vehicle status determination section 23 is arranged so as to estimate the status of the vehicle 10 as a "traveling state." Specifically, when the vehicle 10 is traveling forwardly or rearwardly, the vehicle status determination section 23 determines that the vehicle 10 is in a traveling state.

The vehicle status determination section 23 integrates the acceleration of the vehicle 10 detected by the G sensor 15, to thus acquire the vehicle velocity V of the vehicle 10.

The vehicle status determination section 23 computes the period TIG elapsing since the ignition switch was turned on by use of Equation (2) provided below.

$$TIG(k)=TIG(k-1)+CT \qquad (2)$$

Further, the vehicle status determination section 23 computes a period achieved since the vehicle velocity V came to zero (a period elapsed since the vehicle stopped) TST by use of Equation (3) provided below.

$$TST(k)=TST(k-1)+CT \qquad (3)$$

In Equations (2) and (3), reference symbol CT designates a control cycle period.

The filter gain setting section 24 sets any one of a small gain αS, a medium gain αM, and a large gain αL as the filter gain α used for filtering processing performed by the foregoing filtering processing section 22.

More specifically, when the vehicle status determination section 23 determines the vehicle 10 to be in a starting state, the filter gain setting section 24 sets the small gain αS as the filter gain α.

When the vehicle 10 is determined to be in a halted state, the filter gain setting section 24 sets the medium gain αM as the filter gain α.

When the vehicle 10 is determined to be in a state achieved immediately after stoppage of a vehicle or a traveling state, the filter gain setting section 24 sets the large gain αL as a filter gain α.

The small gain αS, the medium gain αM, and the large gain αL are set so as to fulfill the relationship expressed by Equation (4) provided below.

$$\alpha S<\alpha M<\alpha L \qquad (4)$$

The alcohol concentration detection section 25 estimates the quantity of fuel to be fed to the fuel tank 12 on the basis of the estimated quantity of storage LF computed by the filtering processing section 22 and estimates, on the basis of the estimated quantity of fuel to be fed, the concentration of alcohol (an alcohol content) ALCH in a composite fuel stored in the fuel tank 12. For instance, a technique for detecting the concentration of alcohol ALCH in stored fuel performed by the alcohol concentration detection section 25 is as follows. Specifically, the concentration of alcohol is detected on the basis of a feedback correction value of a fuel injection quantity that is controlled through feedback in accordance with an exhaust-fuel ratio. In the meantime, a tentative concentration of alcohol in the fuel tank achieved after refueling is computed on the basis of the quantity of stored fuel achieved before refueling, a detected value of an alcohol concentration, the quantity of refueled fuel, and the concentration of refuelable alcohol (the concentration of commercially-available alcohol-mixed fuel: 0% or 85%) for the case where a highly-concentrated composite fuel is refueled and where a lowly-concentrated composite fuel is refueled. An alcohol concentration detected value estimated from the feedback correction value of the exhaust-fuel ratio is limited by means of the tentative concentration of highly-concentrated alcohol and the tentative concentration of lowly-concentrated alcohol.

The apparatus for estimating the quantity of fuel stored in a vehicle of the embodiment of the present invention is configured as mentioned above, and hence a working-effect and an advantage, which are provided below, are yielded.

As shown in FIG. 2, when an unillustrated ignition switch is turned on (a route Yes in step S11), processing pertaining to a filter gain setting subroutine is executed (step S12). The filter gain setting subroutine is for setting the filter gain α, and specifics of the gain are provided in FIG. 3.

In the subroutine, the vehicle status determination section 23 first computes the period TIG achieved after starting of the engine 11 by use of Equation (2) (step S21).

The vehicle status determination section 23 integrates the acceleration of the vehicle 10 detected by a G sensor 15, to thus compute the vehicle velocity V and determine whether or not the absolute value of the vehicle velocity V is greater than zero (step S22).

When the absolute value of the vehicle velocity V is zero; namely, when the vehicle 10 is at a standstill (a route No in step S22), the vehicle status determination section 23 computes the period TST elapsed since the vehicle 10 stopped, by use of Equation (3) (step S23).

The vehicle status determination section 23 determines whether or not the period TIG computed in step S21 elapsed since the engine started is equal to or greater than a threshold period T1 (step S24). When the period TIG elapsed since the engine started is less than the threshold period T1; namely, when the vehicle is in a state achieved immediately after starting of the engine 11 (a route No in step S24), the vehicle status determination section 23 determines that the vehicle 10 is in a started state, and the filter gain setting section 24 sets the small gain αS as a filter gain α (step S25).

In the meantime, when the period TIG elapsed since the engine started is equal to or greater than the threshold period T1; namely, when a time elapsed since the engine 11 started (a route Yes in step S24), the vehicle status determination section 23 determines whether or not the period TST elapsed since the vehicle stopped computed in step S23 is equal to or greater than the threshold period T2 (step S26).

When the period TST elapsed since the vehicle stopped is equal to or greater than the threshold period T2; namely, when a time elapsed since the vehicle 10 stopped (a route Yes in step S26), the vehicle status determination section 23 determines that the vehicle 10 is at standstill, and the filter gain setting section 24 sets the medium gain αM as the filter gain α (step S27).

When the period TST elapsed since the vehicle stopped is less than the threshold period T2; namely, when the vehicle 10 is in a state achieved immediately after stopped (a route No in step S26), the vehicle status determination section 23 determines that the vehicle 10 is in a state achieved immediately after stopped, and the filter gain setting section 24 sets the large gain αL as the filter gain α (step S28).

When the vehicle velocity V is greater than zero; namely, when the vehicle 10 is running (a route Yes in step S22), the vehicle status determination section 23 resets the period TST elapsed after the vehicle stopped to zero (step S29).

Moreover, the vehicle status determination section 23 determines the vehicle 10 to be in a traveling state, and the filter gain setting section 24 sets the large gain αL as the filter gain α (step S28).

When execution of processing pertaining to the subroutine shown in FIG. 3 is completed, processing returns to the main routine shown in FIG. 2, and the filtering processing section 22 reads a value (i.e., a detected fuel quantity) L output from the fuel level sensor 14 in step S13 (step S13).

Subsequently, the filtering processing section 22 sets, as the filter gain α, the filter gain α set in any of steps S25, S27, and S28 shown in FIG. 3; namely, the small gain αS, the medium gain αM, and the large gain αL, and applies the thus-set filter gain to Equation (1), thereby computing the estimated quantity of storage LF (step S14).

The alcohol concentration detection section 25 estimates the quantity of fuel fed to the fuel tank 12 on the basis of the estimated quantity of storage LF computed in step S14, as well as estimating the concentration of alcohol ALCH in the composite fuel in the fuel tank 12 on the basis of the estimated quantity of fuel to be refueled (step S15).

When the ignition switch is deactivated (a route No in step S11), the vehicle status determination section 23 resets to zero the period TIG elapsed since the engine was started (step S16) and sets the period TST elapsed since the vehicle stopped to the threshold period T2 (step S17). Specifically, when the ignition switch is deactivated in step S17, the vehicle 10 is deemed to be at a standstill for a comparatively-long period of time.

As mentioned above, the apparatus for estimating the quantity of fuel stored in a vehicle of the embodiment of the present invention enables high-precision detection in accordance with the traveling state of the vehicle 10.

Estimation of the quantity of fuel remaining in the fuel tank 12 in a more specific situation will be described by reference to timing charts shown in FIGS. 4A and 4B. Objects indicated by lines shown in FIG. 4A are as follows:

A two-dot chain line (a): an estimated quantity of storage LF computed by use of the small gain αS A chain line (b): an estimated quantity of storage LF computed by use of the medium gain αM A broken line (c): an estimated quantity of storage LF computed by use of the large gain αL A fine solid line (d): a quantity of fuel L measured by the fuel level sensor 14

A solid line in FIG. 4B designates whether or not the vehicle 10 is the process of traveling or at a standstill.

When the engine 11 starts (a point in time t0), the estimated quantity of storage LF acquired by use of any of the small gain αS, the medium gain αM, and the large gain αL gradually ascends to indicate the quantity of fuel stored in the fuel tank 12.

However, the gradient of the two-dot chain line (a), the gradient of the chain line (b), and the gradient of the broken line (c) differ from each other. This is a phenomenon attributable to a decrease in response of the estimated quantity of storage LF as the filter gain α increases.

Put another way, use of the small gain αS instead of the medium gain αM and the large gain αL enables enhancement of the response of the estimated quantity of storage LF and accurate, quick detection of the quantity of fuel remaining in the fuel tank 12.

Subsequently, when the vehicle 10 starts running (points in time t1 to t2), the fuel in the fuel tank 12 undulates because of vibrations of the vehicle 10; hence, the liquid level of the fuel unstably fluctuates (see the fine solid line (d)). The two-dot chain line (a) and the fine solid line (d) essentially overlap each other at points in time subsequent to point in time t1.

At this time, the chain line (b) showing the estimated quantity of storage LF computed by use of the medium gain αM is smoothed as compared with the quantity of fuel L measured by the fuel level sensor 14. However, the fuel is still fluctuating unstably, and it is difficult to appropriately estimate the quantity of fuel remaining in the fuel tank 12 on the basis of the estimated quantity of storage LF (the chain line (b)).

In the meantime, the estimated quantity of storage LF (designated by a broke line (c)) computed by use of the large gain αL is sufficiently smoothed, and the quantity of fuel remaining in the fuel tank 12 can be appropriately estimated.

As a matter of course, response of the estimated quantity of storage LF (the broken line (c)) computed by use of the large gain αL is degraded as compared with the estimated quantity of storage LF (the two-dot chain line (a)) computed by use of the small gain αS or the estimated quantity of storage LF (the chain line (b)) computed by use of the medium gain αM mentioned previously. However, when the vehicle 10 is running, the situation in which a considerably abrupt change arises in the quantity of fuel remaining in the fuel tank 12 (e.g., a situation in which the fuel tank 12 is fed with fuel) is inconceivable in normal times. Hence, deterioration of response does not particularly pose any problem in reality.

Subsequently, when the vehicle 10 comes to a stop (a point in time t2), the liquid level of the fuel in the fuel tank 12 is still in an unstably-undulating state immediately after stoppage of the vehicle. Specifically, a period between points in time t2 to t3 corresponds to a period during which the vehicle status determination section 23 determines that the vehicle 10 is in a state achieved immediately after stopped. In this case, filtering processing using the large gain αL is successively performed, whereby the estimated quantity of storage LF is acquired.

However, when a certain period of time elapses since the vehicle 10 stopped (a point in time subsequent to a point in time t3), the liquid level of the fuel in the fuel tank 12 gradually becomes stable. Consequently, the quantity of fuel remaining in the fuel tank 12 can be accurately detected even when there is used the estimated quantity of storage LF(b) computed by use of the medium gain αM.

Specifically, the state where the vehicle 10 is at a standstill yields the possibility of the fuel tank 12 being fed with fuel. In this case, the quantity of fuel remaining in the fuel tank 12 sharply increases. However, a change in the quantity of fuel can be immediately followed by performance of filtering processing using the medium gain αM that is smaller than the large gain αL.

As mentioned previously, according to the present invention of the embodiment, the vehicle status determination section 23 determines which one of the "starting state," the "stopped state," the "state achieved immediately after stoppage of a vehicle," and the "traveling state" corresponds to the state of the vehicle 10.

According to a result of the determination, the filter gain setting section 24 sets the small gain αS, the medium gain αM, or the large gain αL as the filter gain α.

As expressed by Equation (4), the relationship among the small gain αS, the medium gain αM, and the large gain αL is set such that the small gain αS becomes minimum; that the medium gain αM is greater than the small gain αS; and that the large gain αL is greater than the medium gain αM.

The filtering processing section 22 performs filtering processing, by means of which the quantity of fuel L measured by the fuel level sensor 14 is multiplied by the small gain αS, the medium gain αM, or the large gain αL, thereby acquiring the estimated quantity of storage LF.

Therefore, the quantity of fuel stored in the fuel tank 12 can be stably estimated with high accuracy in accordance with the traveling state of the vehicle 10.

Moreover, as mentioned previously, the vehicle 10 is an FFV. Namely, the composite fuel is fed to the engine 11 mounted in the vehicle 10, but a theoretical air-fuel ratio changes according to the property of the composite fuel. When the engine 11 performs air-fuel ratio feedback operation, a controller (omitted from the drawings) of the engine 11 is required to grasp the property of the composite fuel at all times.

In order to grasp the property of the composite fuel, the controller of the engine 11 is required to detect or estimate the quantity of fuel stored in the fuel tank 12 at the appropriate times with high accuracy. The present invention makes it possible to sufficiently satisfy the requirement.

The alcohol concentration estimation section 25 estimates the quantity of fuel fed to the fuel tank 12 on the basis of the estimated quantity of storage LF and estimates the concentration of alcohol ALCH in the fuel of the fuel tank 12 on the basis of the thus-estimated quantity of fuel to be fed.

The concentration of alcohol ALCH in the fuel can be immediately estimated with high accuracy in accordance with the state of the vehicle 10, and the engine 11 can be operated more appropriately.

When the liquid level of the fuel stored in the fuel tank 12 is measured by means of the fuel level sensor 14, a result of measurement (i.e., the measured quantity of fuel L) changes in accordance with fluctuations of the liquid level of fuel. However, the filter gain setting section 24 changes the filter gain α in accordance with the state of the vehicle 10. Hence, the estimated quantity of storage LF can be stably acquired while a disadvantage yielded as a result of a decrease in the response of the estimated quantity of storage LF stored in the fuel tank 12 acquired through filter processing is sufficiently reduced.

Moreover, the vehicle status determination section 23 classifies the status of the vehicle 10 into any one of the "starting state," the "state achieved immediately after stoppage of a vehicle," the "halted state," and the "traveling state"; hence, the estimated quantity of storage LF can be acquired more elaborately.

Although the embodiment of the present invention has been described thus far, the present invention is not limited to the embodiment and is susceptible to various alterations within the scope of the gist of the present invention.

The above embodiment has described the case where the vehicle 10 is an FFV; however, the present invention is not limited to the FFV. As a matter of course, when the vehicle 10 is an FFV, detection of the estimated quantity of storage LF requires a higher degree of accuracy when compared with the case of a vehicle (a general vehicle) equipped with a common engine using single fuel, such as only gasoline or only light oil. Hence, application of the present invention to the FFV can be said to be a very preferable embodiment.

What is claimed is:

1. An apparatus, configured to estimate quantity of fuel stored in a vehicle, comprising:
   a fuel tank, configured to store fuel used for an engine mounted in the vehicle;
   a fuel quantity measure, configured to measure quantity of fuel stored in the fuel tank;
   a filtering processor, configured to subject the quantity of fuel to filter processing by a filter gain to detect an estimated quantity of fuel stored in the fuel tank;
   a filter gain setter, configured to set the filter gain; and
   a vehicle status detector, configured to detect which one of a starting state, a halted state, a state achieved immediately after stoppage of the vehicle, and a traveling state corresponds to a state of the vehicle, wherein
   the filter gain setter sets a first gain as the filter gain when the vehicle status detector detects that the vehicle is the starting state; sets a second gain as the filter gain, which is larger than the first gain, when the vehicle status determination means determines that the vehicle is in the traveling state or the state achieved immediately after stoppage of the vehicle; and sets a third gain as a filter gain, which is larger than the first gain and smaller than the second gain, when the vehicle status determination means determines that the vehicle is in the halted state.

2. The apparatus according to claim 1, wherein the vehicle is a flexible fuel vehicle that causes an engine to burn composite fuel stored in the fuel tank, thereby acquiring driving force.

3. The apparatus according to claim 2, further comprising an alcohol content estimator, configured to estimate the quantity of fuel fed to the fuel tank based on the estimated quantity of storage determined by the filtering processor, and estimate an alcohol content in the composite fuel based on the estimated quantity of fuel.

4. The apparatus according to claim 1, wherein the fuel quantity measure is a fuel level sensor configured to measure a liquid level of the fuel stored in the fuel tank.

5. The apparatus according to claim 1, wherein the vehicle status detector detects that:

the state of the vehicle is the starting state when the vehicle is at a standstill and when a period achieved after starting of the engine does not reach a first threshold period;

the state of the vehicle is the state achieved immediately after stoppage of the vehicle when the vehicle is at a standstill, when the period achieved after starting of the engine reached the first threshold period, and when a period achieved after stoppage of the vehicle does not reach a second threshold period;

the state of the vehicle is the halted state when the vehicle is at a standstill, when the period achieved after starting of the engine reached the first threshold period, and when the period achieved after stoppage of the vehicle reached the second threshold period; and the state of the vehicle is the traveling state when the vehicle is in the middle of traveling.

* * * * *